(12) United States Patent
Hirano et al.

(10) Patent No.: US 8,840,097 B2
(45) Date of Patent: Sep. 23, 2014

(54) PRODUCTION SYSTEM

(75) Inventors: Yusuke Hirano, Fukuoka (JP);
Tomohiro Matsuo, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 665 days.

(21) Appl. No.: 13/008,355

(22) Filed: Jan. 18, 2011

(65) Prior Publication Data

US 2011/0175274 A1    Jul. 21, 2011

(30) Foreign Application Priority Data

Jan. 19, 2010  (JP) ............. P. 2010-008794

(51) Int. Cl.
| | |
|---|---|
| B23Q 1/25 | (2006.01) |
| B23Q 1/64 | (2006.01) |
| B23Q 3/18 | (2006.01) |
| B21D 39/03 | (2006.01) |
| G05B 15/00 | (2006.01) |
| B25J 9/00 | (2006.01) |

(52) U.S. Cl.
CPC .............. *B25J 9/0084* (2013.01); *B25J 9/0087* (2013.01)
USPC ............. 269/56; 269/55; 269/60; 29/428; 700/260

(58) Field of Classification Search
CPC .................................. B23Q 1/00; B25B 27/00
USPC .............. 269/289 R, 55, 56, 71, 75
See application file for complete search history.

(56) References Cited

U.S. PATENT DOCUMENTS

| | | | |
|---|---|---|---|
| 6,712,579 B2 | 3/2004 | Fujii et al. | |
| 7,646,161 B2 * | 1/2010 | Albu-Schaffer et al. | ... 318/568.2 |
| 2002/0150459 A1 | 10/2002 | Fujii et al. | |
| 2007/0239315 A1 * | 10/2007 | Sato et al. | ...... 700/245 |
| 2007/0265731 A1 * | 11/2007 | Merk et al. | ...... 700/245 |
| 2009/0249606 A1 * | 10/2009 | Diez et al. | ......... 29/428 |
| 2011/0022228 A1 | 1/2011 | Mikurube et al. | |
| 2011/0166709 A1 * | 7/2011 | Kim et al. | ...... 700/260 |

FOREIGN PATENT DOCUMENTS

| | | |
|---|---|---|
| CN | 1303249 | 7/2001 |
| JP | 62-275597 | 11/1987 |
| JP | 06-107253 | 4/1994 |
| JP | 06-143084 | 5/1994 |
| JP | 06-312385 | 11/1994 |

(Continued)

OTHER PUBLICATIONS

Chinese Office Action for corresponding CN Application No. 201010623292.6, Jan. 22, 2013.
Chinese Office Action for corresponding CN Application No. 201010623292.6, Jun. 9, 2013.

(Continued)

*Primary Examiner* — Lee D Wilson
*Assistant Examiner* — Seahee Yoon
(74) *Attorney, Agent, or Firm* — Mori & Ward, LLP

(57) ABSTRACT

A production system includes a workpiece stocker, a dual-arm robot, and a second robot. A workpiece is to be placed on the workpiece. The dual-arm robot is arranged at a transportation access portion of the workpiece stocker. The second robot is arranged to face a forward portion of a torso of the dual-arm robot.

13 Claims, 5 Drawing Sheets

(56) References Cited

FOREIGN PATENT DOCUMENTS

| | | |
|---|---|---|
| JP | 6-320364 | 11/1994 |
| JP | 08-174448 | 7/1996 |
| JP | 2002-313886 | 10/2002 |
| JP | 2004-358526 | 12/2004 |
| JP | 2006-035346 | 2/2006 |
| JP | 2009-214228 | 9/2009 |
| WO | WO 99/49785 | 10/1999 |

OTHER PUBLICATIONS

Japanese Office Action for corresponding JP Application No. 2010-008794, Apr. 23, 2013.
Chinese Office Action for corresponding CN Application No. 201010623292.6, Sep. 9, 2013.
Chinese Office Action for corresponding CN Application No. 201010623292.6, Feb. 8, 2014.

* cited by examiner

ID SYSTEM

CROSS-REFERENCE TO RELATED APPLICATION

The present application claims priority under 35 U.S.C. §119 to Japanese Patent Application No. 2010-008794 filed Jan. 19, 2010. The contents of this application are incorporated herein by reference in their entirety.

BACKGROUND OF THE INVENTION

1. Field of the Invention
The present invention relates to a production system.
2. Description of the Related Art
Japanese Unexamined Patent Application Publication No. 1994-320364 discloses a conventional production system that uses two horizontal multi-joint robots.

SUMMARY OF THE INVENTION

According to one aspect of the present invention, a production system includes a workpiece stocker, a dual-arm robot, and a second robot. A workpiece is to be placed on the workpiece. The dual-arm robot is arranged at a transportation access portion of the workpiece stocker. The second robot is arranged to face a forward portion of a torso of the dual-arm robot.

According to another aspect of the present invention, a production system includes a workpiece stocker and a dual-arm robot. A workpiece is to be placed on the workpiece stocker. The dual-arm robot is arranged at a transportation access portion of the workpiece stocker. The dual-arm robot is configured to shift the workpiece.

According to further aspect of the present invention, a method for processing a workpiece includes providing a dual-arm robot at a transportation access portion of a workpiece stocker. A second robot is provided to face a forward portion of a torso of the dual-arm robot. A workpiece placed on the workpiece stocker is provided using the dual-arm robot. The workpiece placed on the workpiece stocker is provided using the second robot.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
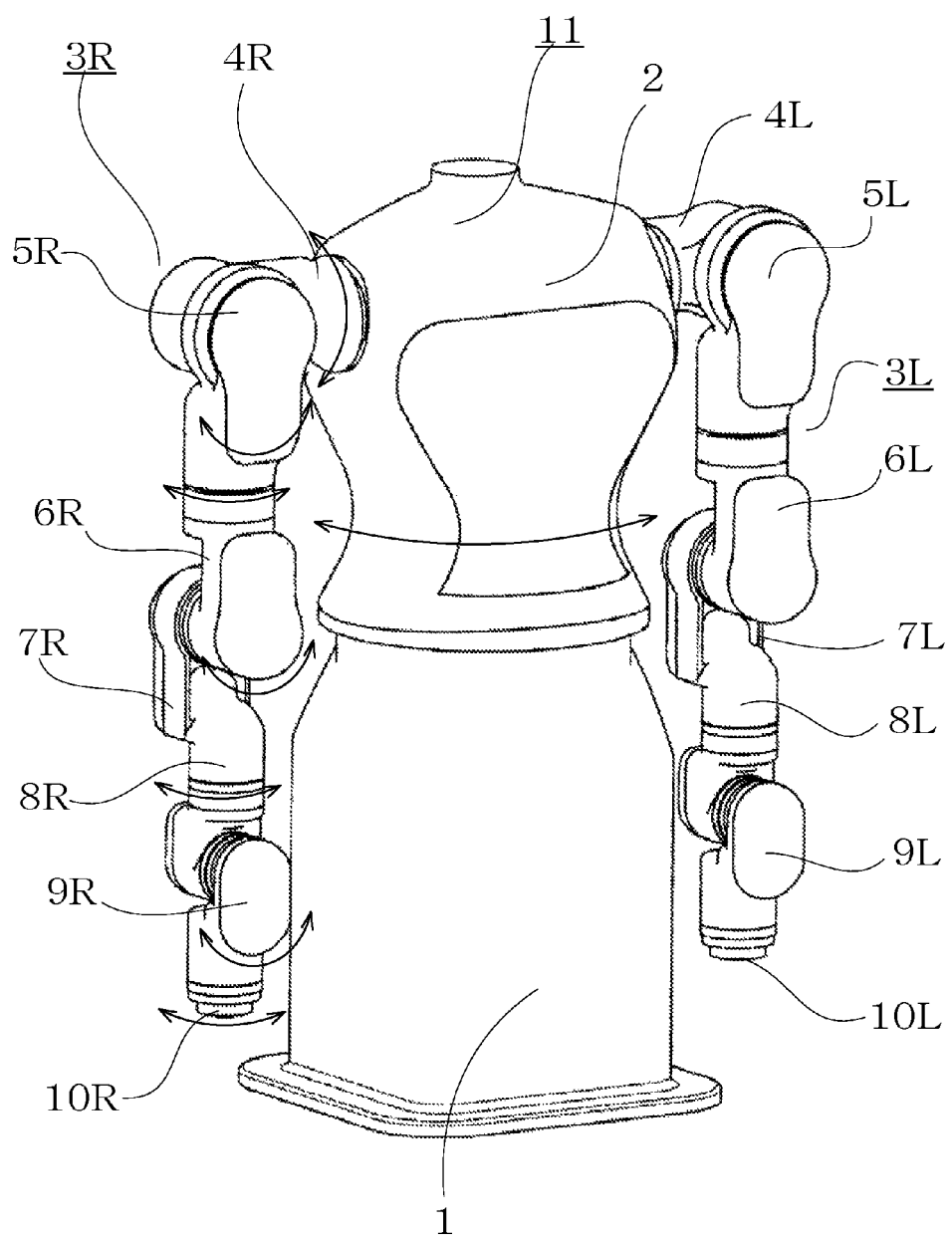
FIG. 1 illustrates a front view of a dual-arm robot.

The embodiments will now be described with reference to the accompanying drawings, wherein like reference numerals designate corresponding or identical elements throughout the various drawings.

First Embodiment

A dual-arm robot 11 according to a first embodiment of the present invention will be described with reference to FIG. 1.

A base section 1 is secured using an anchor bolt (not illustrated), and a turnable torso section 2 is installed on the base section 1 in a turnable manner within a vertical plane. A right arm section 3R is provided at a left side of the turnable torso section 2 in the front view, and a right shoulder 4R is provided in a turnable manner within a horizontal plane. A right upper arm "A" 5R is provided on the right shoulder 4R in a swingable manner. A right upper arm "B" 6R is provided on a tip end of the right upper arm "A" 5R. Herein, the right upper arm "B" 6R is imparted with a twisting action for a turning action. Further, a right lower arm 7R is provided on a tip end of the right upper arm "B" 6R in a swingable manner. A right wrist "A" 8R is provided on a tip end of the right lower arm 7R, and a right wrist "B" 9R is provided on a tip end of the right wrist "A" 8R. The right wrist "A" 8R is imparted with a twisting action for a turning action, and the right wrist "B" 9R is imparted with a turning action for a bending action. A right flange 10R is provided on a tip end of the right wrist "B" 9R. To the right flange 10R, a hand (not illustrated) can be connected and a twisting action is imparted. A left arm section 3L including a left shoulder 4L, a left upper arm "A" 5L, a left upper arm "B" 6L, a left lower arm 7L, a left wrist "A" 8L, a left wrist "B" 9L and a left flange 10L is provided at a right side when being seen from an upper surface, in a manner similar to that described above.

Such a configuration has a feature in that the turnable torso section 2, the right arm section 3R and the left arm section 3L are operated cause the hand to be attached to the tip end of each of the right flange 10R and the left flange 10L.

A component production system using the dual-arm robot 11 will be described in detail with reference to FIGS. 2 to 7.

The first dual-arm robot 11 transports a workpiece 13, which is stored in a workpiece stocker 12 conveyed from a left side of each figure, to a working area 14 at a right side of each figure in such a manner that the right arm section 3R and the left arm section 3L perform a task of shifting the workpiece 13. Then, a second dual-arm robot 21 that faces the first dual-arm robot 11 mounts a component 20 on the workpiece 13 to assemble a workpiece component.

The first dual-arm robot 11 is arranged between the workpiece stocker 12 and the working area 14. The first dual-arm robot 11 has a right hand 15R and a left hand 15L which are in initial positions on a straight line connecting between the workpiece 13 and a center of the working area 14. The right hand 15R and the left hand 15L cause the workpiece 13 to move linearly from the workpiece stocker 12 to the working area 14. The first dual-arm robot 11 places the workpiece component produced in the working area 14 on a transportation tray 24 arranged in a direction orthogonal to the workpiece stocker 12 and the working area 14, with a position of the workpiece component set thereby, so that the workpiece component is transferred to a subsequent process.

In the first dual-arm robot 11, the right arm section 3R and the left arm section 3L are each equipped with seven shafts including a redundant shaft so as to approach the turnable torso section 2. Thus, distances from the workpiece stocker 12 and the working area 14 to the first dual-arm robot 11 become shorter than a movable range of the first dual-arm robot 11. As a result, the workpiece stocker 12 and the working area 14 as well as the transportation tray 24 are arranged closely to such a degree that the opposite arm section to the workpiece placement position reaches the workpiece 13. For example, it is apparent from FIGS. 2 and 3 that it is possible to hold the workpiece 13 stored in the workpiece stocker 12 by the action of the left arm section 3L.

Herein, the working area 14 does not mean an area to be obtained from a movable range of the first dual-arm robot, but means an area where the first dual-arm robot and the second dual-arm robot assemble a workpiece component.

Figure 2:
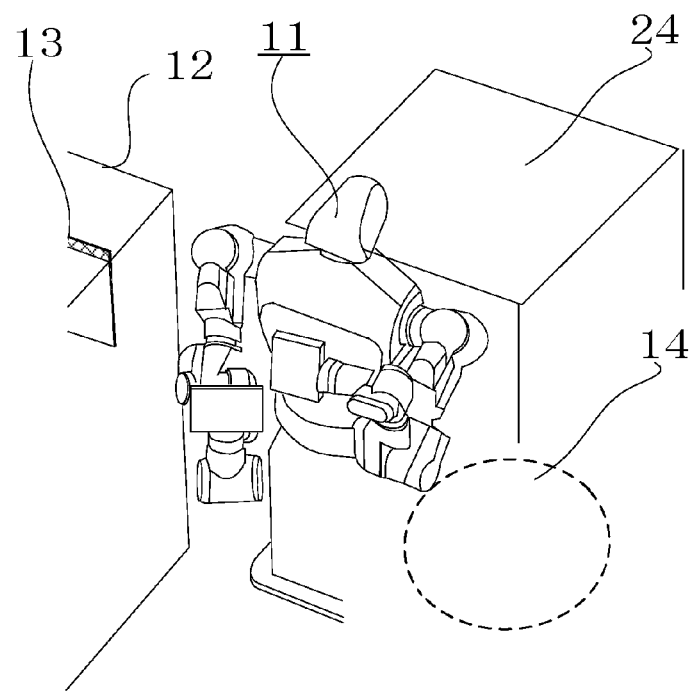
FIG. 2 illustrates a perspective view of a production system according to a first embodiment of the present invention.
Figure 3:
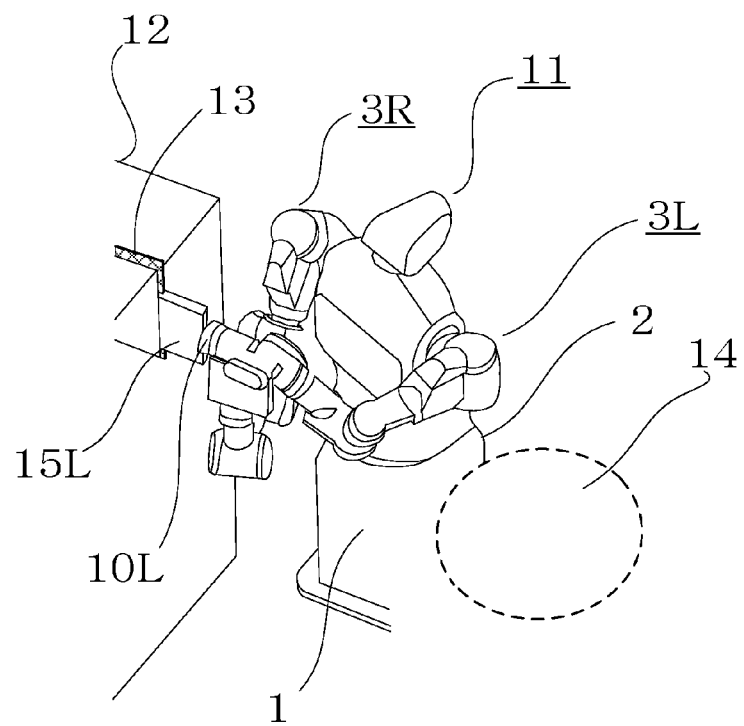
FIGS. 3 to 7 each illustrate workpiece transportation by the dual-arm robot.

Next, the workpiece transporting task will be described. First, the operation of the left arm section 3L, i.e., the operation of picking up the workpiece 13 stored in the workpiece stocker 12 will be described with reference to FIG. 3. In the first dual-arm robot 11, the turnable torso section 2 turns by a predetermined angle with respect to the base section 1 in the direction of the workpiece stocker 12. As illustrated in FIG. 2, the left arm section 3L changes from an initial posture to a pickup posture to pick up the workpiece 13 in such a manner that each shaft rotates by a predetermined angle, in accordance with an operation taught in advance. Thus, the left hand 15L attached to the left flange 10L of the left arm section 3L holds the workpiece 13. At this time, the right arm section 3R is in an initial posture or is brought into such a posture as to be located at a position where the right arm section 3R does not interfere with a movement trail of the left arm section 3L. Herein, the workpiece 13 is aligned to a certain degree in the workpiece stocker 12. However, the workpiece 13 is not placed at an accurate position, but is placed to a degree that the left hand 15L can hold the workpiece 13. That is, the workpiece stocker 12 is slightly larger in size than the workpiece 13. The plurality of workpieces 13 are not necessarily placed at an identical position in the workpiece stocker 12 without fail.

Figure 4:
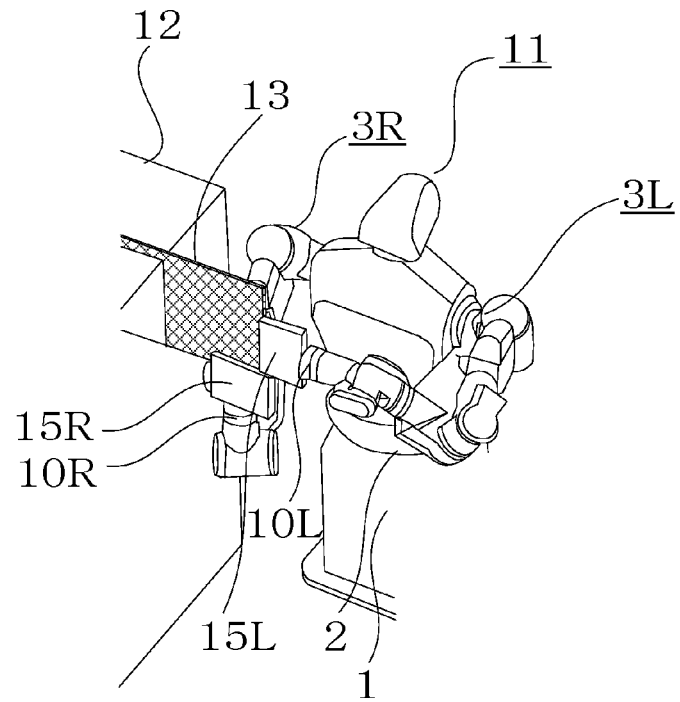
Figure 5:
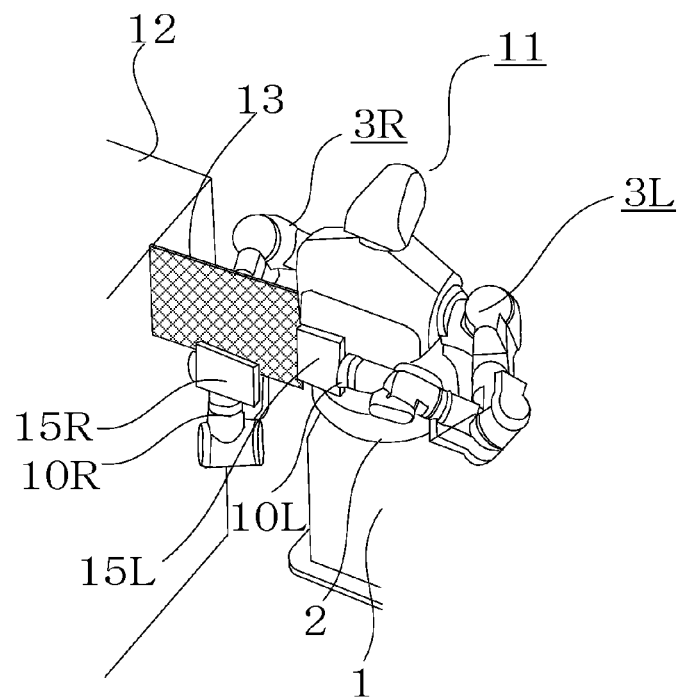

Next, as illustrated in FIG. 4, the left hand 15L that holds the workpiece 13 pulls the workpiece 13 out of the workpiece stocker 12. Herein, the right arm section 3R is brought into such a posture that the right hand 15R attached to the right flange 10R comes into contact with the workpiece 13 in such a manner that each shaft rotates by a predetermined angle. As illustrated in FIG. 5, the left arm section 3L is brought into such a posture that the right hand 15R is located at a predetermined position of the workpiece 13 (a center portion of the workpiece 13) in the state in which the left hand 15L holds the workpiece 13. Then, the right arm section 3R is brought into such a posture that the right hand 15R slightly moves in a certain direction of the workpiece 13 (an upper direction in FIG. 5). When a contact sensor (not illustrated) detects contact of the workpiece 13 with an end of the right hand 15R, the right hand 15R holds the workpiece 13. Herein, if the position of the right hand 15R is different from a position taught in advance, a deviation amount is stored as an error, and a target position obtained by addition or subtraction by the deviation amount is reset for the working area 14. Next, the left hand 15L releases the workpiece 13, and then moves in a certain direction of the workpiece 13 (a left direction in FIG. 5). When a contact sensor (not illustrated) detects contact of the workpiece 13 with an end of the left hand 15R, the left hand 15L holds the workpiece 13 again.

At this time, in the right arm section 3R and the left arm section 3L each holding the workpiece 13, rotation positions of the respective shafts each have an error corresponding to a deviation amount of the workpiece 13 from a predetermined position. The error corresponding to this deviation amount is superimposed on a target position to the working area for placement to set a new target position, and the respective shafts of the right arm section 3R and the left arm section 3L are moved.

Moreover, when holding the workpiece 13 in the workpiece stocker 12, the left hand 15L grasps an accurate position and therefore transports the workpiece 13 to the working area 14 without performing the shifting task.

In this embodiment, the contact sensor (not illustrated) detects the contact of the workpiece with the end of the hand. However, the present invention is not limited thereto. A proximity switch or the like having a function identical to that of the contact sensor may be used so long as to detect such contact. This contact may also be obtained from a current or a voltage of an actuator that drives the respective shafts in accordance with a variation of a load to be imposed on the arm section by the contact.

Figure 6:
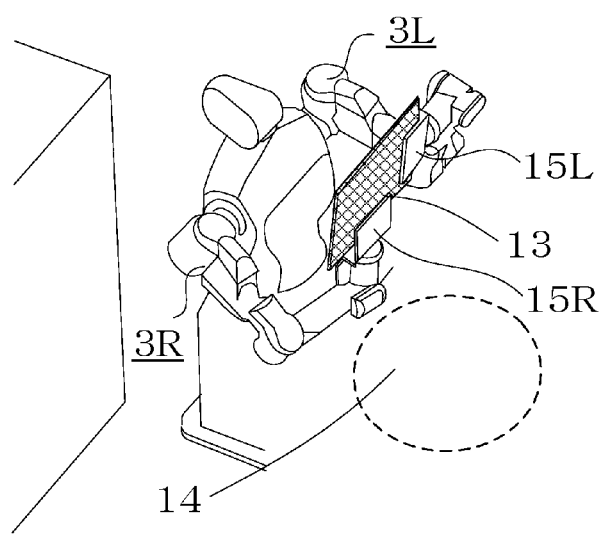

Next, as illustrated in FIG. 6, in a state in which the right hand 15R and the left hand 15L hold the workpiece 13 and the right arm section 3R and the left arm section 3L are maintained at their postures, the turnable torso section 2 turns with respect to the base section 1 in the direction of the working area 14.

In the foregoing description referring to FIG. 5, the right hand 15R and the left hand 15L perform the shifting task at the position where the turnable torso section 2 stops. However, the shifting task may be performed during a period that the turnable torso section 2 moves from the position illustrated in FIG. 5 to a predetermined position illustrated in FIG. 6. In such a case, it is possible to achieve reduction in time.

Figure 7:
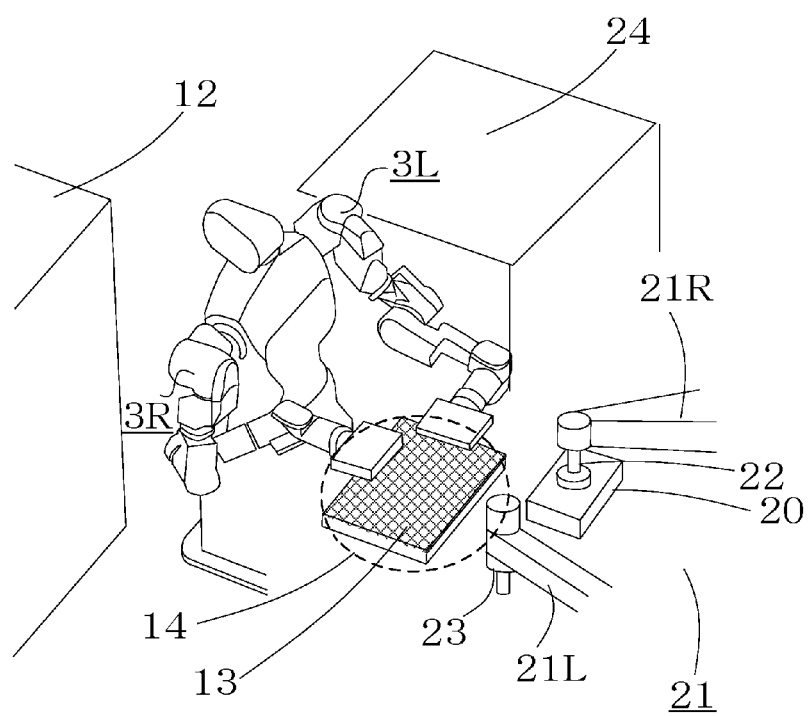

Finally, as illustrated in FIG. 7, each of the right arm section 3R and the left arm section 3L is brought into a predetermined posture such that the workpiece 13 is placed on the working area 14.

Next, a workpiece component assembling task will be described. The position of the workpiece 13 transported by the right hand 15R and the left hand 15L is set at the working area 14. On the other hand, the second dual-arm robot 21 is arranged to face the first dual-arm robot 11 with the working area 14 interposed therebetween. As described above, this system is configured such that the first and second dual-arm robots perform the task in the same working area. Herein, the second dual-arm robot 21 includes a right arm section 21R, and a holding tool 22 is attached to a tip end of the right arm section 21R. The second dual-arm robot 21 also includes a left arm section 21L, and a thread fastening tool 23 is attached to a tip end of the left arm section 21L.

The right arm section 21R of the second dual-arm robot 21 holds the component 20 with a predetermined position of the component 20 set. Next, the right arm section 21R rotates by a predetermined angle to mount the component 20 on the workpiece 13. Subsequently, the thread fastening tool 23 attached to the left arm section 21L fastens the workpiece 13 to the component 20.

The thread fastening tool 23 may always be attached to the left arm section 21L. Alternatively, the holding tool may be attached to the left arm section 21L to hold the thread fastening tool if necessary. Moreover, a tool exchanger may be attached to the tip end of the left arm section 21L.

At this time, a wrist shaft of the right arm section 21R is brought into a servo floating state in a thread fastening task. More specifically, the wrist shaft of the right arm section 21R is brought into a state of reducing control rigidity to freely act about an axis of rotation.

The servo floating function allows a relative deviation in hole position between the workpiece 13 and the component 20.

The first dual-arm robot places the workpiece component assembled as described above on a predetermined position of the transportation tray 24, so that the workpiece component is transferred to a subsequent process.

The transportation tray may be a bench to be held by the robot in a subsequent process or may be a conveyor.

Second Embodiment

Figure 8:
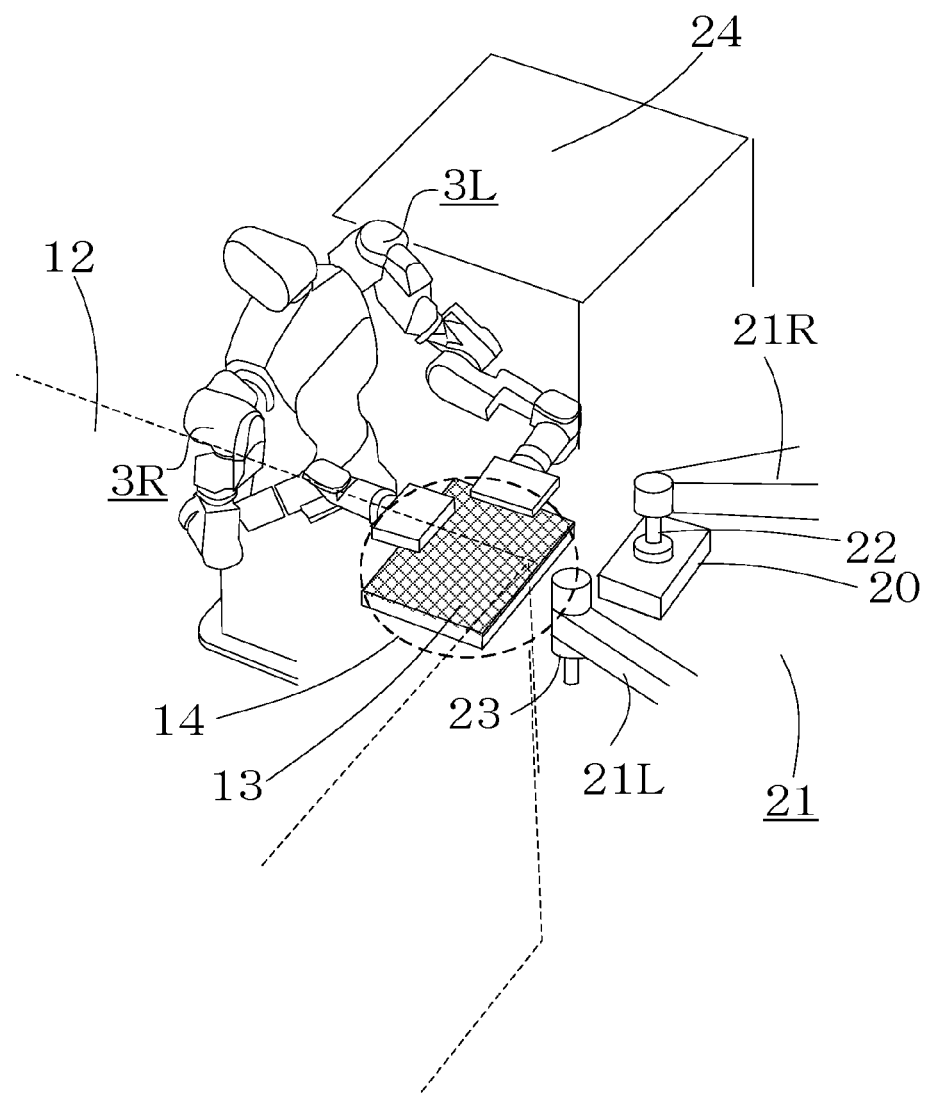
FIG. 8 illustrates a perspective view of a production system according to a second embodiment of the present invention.

As illustrated in FIG. 8, a first dual-arm robot 11 transports a workpiece 13 stored in a workpiece stocker 12 conveyed from a front side of FIG. 8 to a working area 14 at a right side of FIG. 8 in such a manner that a right arm section 3R and a left arm section 3L perform a task of shifting the workpiece 13. Then, a second dual-arm robot 21 that faces the first dual-arm robot 11 mounts a component 20 on the workpiece 13 to assemble a workpiece component. The second dual-arm robot 21 is arranged to face the first dual-arm robot 11 with the working area 14 interposed therebetween. Moreover, a transportation tray 24 is located at an opposite position to the workpiece stocker 12 with the first dual-arm robot 11 interposed therebetween.

The first dual-arm robot and the second dual-arm robot are arranged as described above, and the workpiece stocker 12 and the transportation tray 24 are arranged as described above, so that a working space can be reduced in size.

Operations of the first dual-arm robot and the second dual-arm robot are similar to those described in the first embodiment; therefore, detailed description thereof will not be given here.

In this embodiment, a rectangular workpiece is described as an example; however, the present invention is not limited thereto. A rectangular parallelepiped workpiece or an oddly shaped workpiece may be employed as a matter of course. In the foregoing description, the second dual-arm robot is used for placement and assembly of a component. Herein, the second robot may be a vertical multi-joint type industrial robot. Moreover, a single-arm robot may be used if necessary.

Further, the second robot is not necessarily provided depending on details of a task, and a working time. In such a case, only the first dual-arm robot may be provided.

What is claimed as new and is desired to be secured by Letters Patent of the United States is:

1. A production system comprising:
   a workpiece stocker on which a workpiece is to be placed;
   a dual-arm robot arranged at a transportation access portion of the workpiece stocker; and
   a second robot arranged to face a forward portion of a torso of the dual-arm robot,
   wherein the dual-arm robot includes a first hand and a second hand which are configured to move in different directions from each other relative to the workpiece to hold the workpiece,
   wherein the first hand is configured to hold the workpiece placed on the workpiece stocker and to pull the workpiece out of the workpiece stocker in accordance with an operation taught in advance,
   wherein the second hand is configured to move close to the workpiece held by the first hand and to hold the workpiece at a first position different from a position at which the first hand is to hold the workpiece, and
   wherein a deviation amount between a target held position of the workpiece and the position at which the first hand holds the workpiece is detected based on an actual position of the second hand holding the workpiece at the first position and a position of the second hand taught in advance.

2. The production system according to claim 1, wherein the second robot performs a task in a working area of the dual-arm robot.

3. The production system according to claim 1, wherein the second robot performs a task for the workpiece held by the dual-arm robot.

4. The production system according to claim 1, wherein the dual-arm robot comprises an arm section equipped with not less than seven shafts including a redundant shaft.

5. The production system according to claim 1, wherein the dual-arm robot performs a task of shifting the workpiece.

6. The production system according to claim 1, wherein the workpiece stocker, the dual-arm robot and the second robot are arranged in line.

7. The production system according to claim 1, wherein the second robot arranged to face the torso of the dual-arm robot is arranged beside the workpiece stocker.

8. The production system according to claim 1, wherein the second robot comprises a dual-arm robot.

9. The production system according to claim 1, wherein the second robot comprises a single-arm vertical multi joint robot.

10. A production system comprising:
    a workpiece stocker on which a workpiece is to be placed; and
    a dual-arm robot arranged at a transportation access portion of the workpiece stocker and configured to shift the workpiece,
    wherein the dual-arm robot includes a first hand and a second hand which are configured to move in different directions from each other relative to the workpiece to hold the workpiece,
    wherein the first hand is configured to hold the workpiece placed on the workpiece stocker and to pull the workpiece out of the workpiece stocker in accordance with an operation taught in advance,
    wherein the second hand is configured to move close to the workpiece held by the first hand and to hold the workpiece at a first position different from a position at which the first hand is to hold the workpiece, and
    wherein a deviation amount between a target held position of the workpiece and the position at which the first hand holds the workpiece is detected based on an actual position of the second hand holding the workpiece at the first position and a position of the second hand taught in advance.

11. A method for processing a workpiece, comprising:
    providing a dual-arm robot at a transportation access portion of a workpiece stocker;
    providing a second robot to face a forward portion of a torso of the dual-arm robot;
    processing a workpiece placed on the workpiece stocker using the dual-arm robot; and
    processing the workpiece placed on the workpiece stocker using the second robot,
    wherein the dual-arm robot includes a first hand and a second hand which are configured to move in different directions from each other relative to the workpiece to hold the workpiece,
    further comprising:
       holding the workpiece placed on the workpiece stocker using the first hand in accordance with an operation taught in advance;
       pulling the workpiece out of the workpiece stocker;
       moving the second hand close to the workpiece held by the first hand;
       holding the workpiece using the second hand at a first position different from a position at which the first hand is to hold the workpiece; and
       detecting a deviation amount between a target held position of the workpiece and the position at which the first hand holds the workpiece based on an actual position of the second hand holding the workpiece at the first position and a position of the second hand taught in advance.

12. The method according to claim 11, further comprising:

holding the workpiece using the first hand at a second position different from the first position to change the position at which the first hand holds the workpiece to the second position; and detecting a deviation amount between the target held position of the workpiece and a position at which the second hand holds the workpiece based on an actual position of the first hand holding the workpiece at the second position and a position of the first hand taught in advance.

13. The production system according to claim 1, wherein the first hand is configured to hold the workpiece at a second position different from the first position to change the position at which the first hand holds the workpiece to the second position, and wherein a deviation amount between the target held position of the workpiece and a position at which the second hand holds the workpiece is detected based on an actual position of the first hand holding the workpiece at the second position and a position of the first hand taught in advance.

* * * * *